United States Patent Office 3,452,327
Patented June 24, 1969

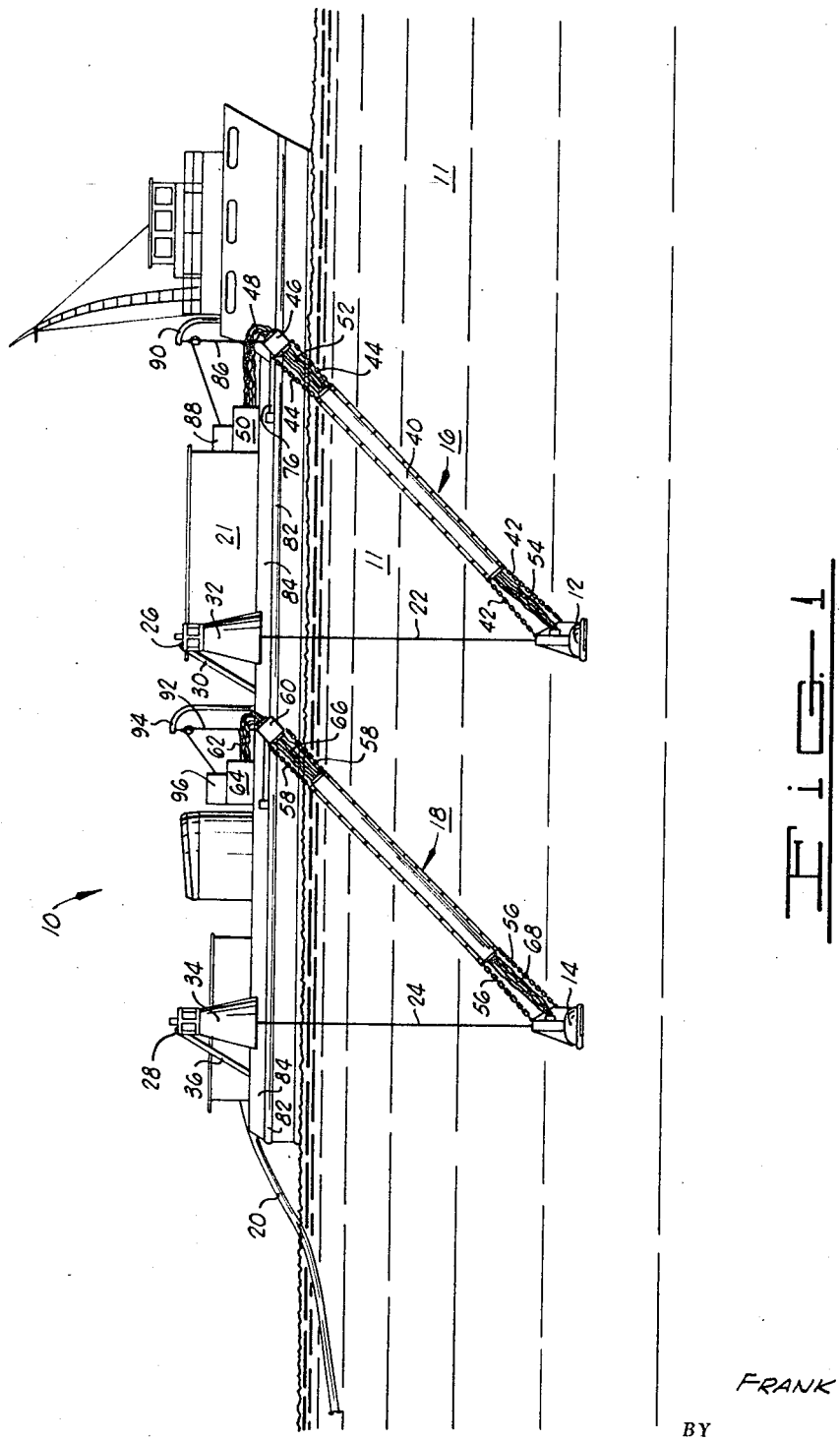

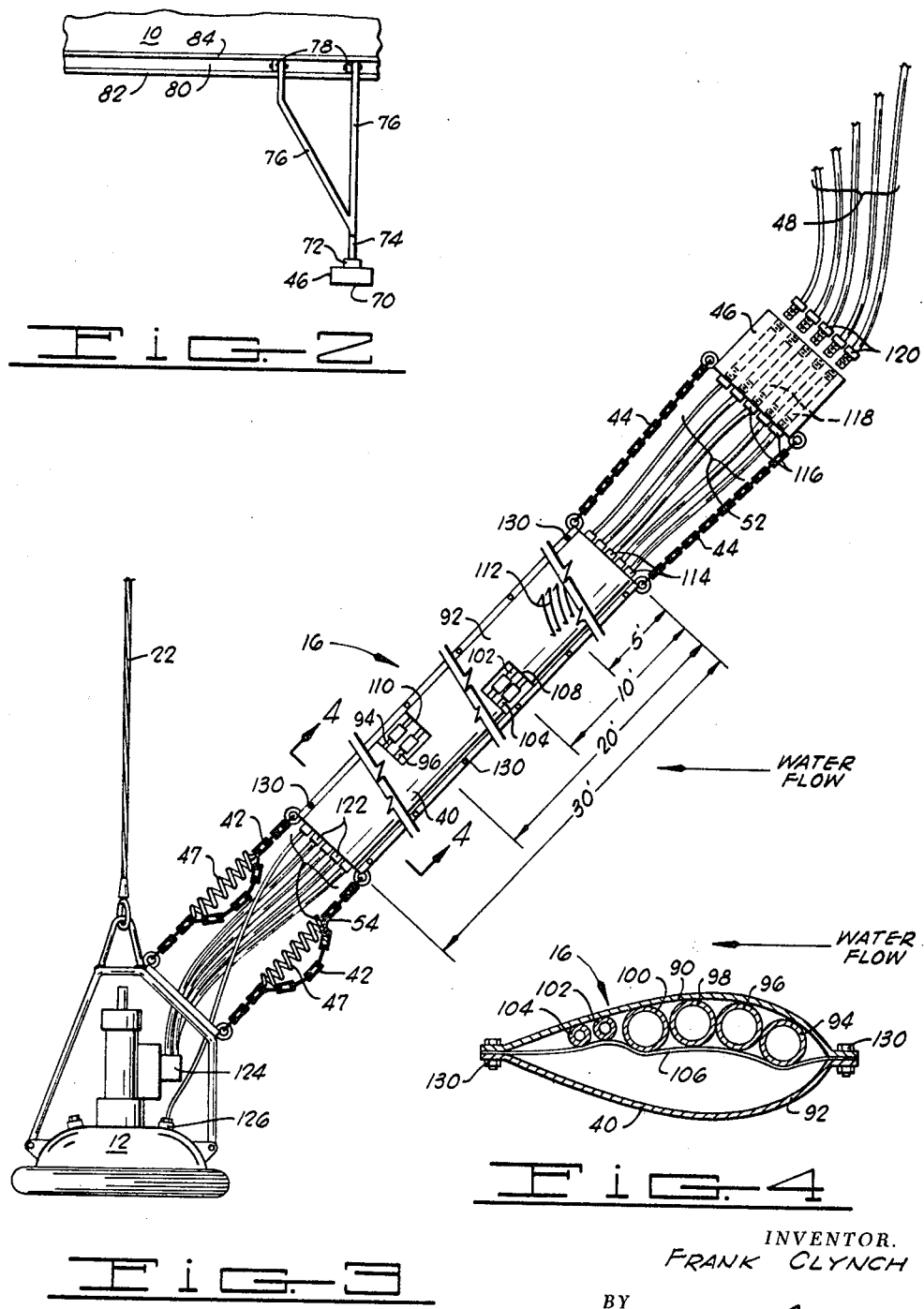

3,452,327
APPARATUS FOR SUPPORTING MARINE SEISMIC TRANSDUCER
Frank Clynch, Ponca City, Okla., assignor to Continental Oil Company, Ponca City, Okla., a corporation of Delaware
Filed Apr. 13, 1967, Ser. No. 630,558
Int. Cl. G01v 1/38
U.S. Cl. 340—7                                    5 Claims

ABSTRACT OF THE DISCLOSURE

An apparatus for supporting a marine seismic transducer from an operating vessel so that it operates at a predetermined water depth. The apparatus consists of a hollow, elongated stiff-leg member which is mounted from a swivel off the ship's quarter and trails downward to support the seismic transducer at a preselected point in the water. The power and control lines for operating the seismic transducer are supplied through flexible couplings to the stiff-leg member, and additional flexible couplings at the bottom of the stiff-leg member apply the control and power lines to the proper connections at the seismic transducer.

BACKGROUND OF THE INVENTION

Field of the invention

This invention relates to improvements in marine seismic prospecting and, more particularly, but not by way of limitation, it relates to improved supporting apparatus for maintaining a seismic transducer at a predetermined depth proximate to an operating vessel.

Description of the prior art

In energizing seismic transducers other than the dynamite or shot types, it has generally been the practice to supply the energizing power via flexible cables or conduits. That is, whether the seismic source was electrical, gas combustion, pneumatic, hydraulically driven, or whatever, the energizing medium or substance and the appurtenant control lines were applied to flexible conduits appropriately bundled or sheaved and thereafter led down to the seismic transducer which was supported from its operating vessel by a tow cable of sufficient strength. Such previous utilization of flexible connector lines had various attendant disadvantages, especially when used with hydraulic or pneumatic sources since vibration, whipping or kicking of the high pressure flexible lines caused surges in power application. Such flexible tow connections were also subject to entanglement and breakage which caused expensive down-time of the seismic survey equipment.

SUMMARY OF THE INVENTION

The present invention contemplates a marine seismic source support which maintains a seismic transducer in rigid, downward trailing attitude from the operating vessel. In a more limited aspect, the invention consists of a hollow, elongated stiff-leg member which is generally wing-shaped such that it can be supported from the operating vessel and allowed to cut through the water with very little resistance. The stiff-leg member contains a plurality of conduits which extend the length thereof and the member is pivotally affixed at the vessel deck level to receive operating power via flexible connections between ship mounted power sources and the plural conduits; the lower end of the stiff-leg member is secured to flexible supporting members to support the seismic transducer while additional flexible conduits connect the respective lower ends of the stiff-leg conduits to their proper input ports or fixtures about the seismic transducer.

Therefore, it is an object of the present invention to provide a marine seismic transducer supporting member which offers increased reliability while, at the same time, enabling improved performance.

It is also an object of the invention to provide a supporting apparatus which is less expensive than the forerunner types of towing apparatus and which is capable of a longer service life.

It is a further object of the present invention to provide a seismic transducer supporting apparatus which enables better operation of the exploration system by providing more uniform seismic transducer energization, more reliable depth keeping capabilities, and less interfering vibration feedback to shipboard.

Finally, it is an object of this invention to provide an apparatus which enables easier stowage and equipment handling when the seismic transducer and support are raised out of the water in their non-operating attitude.

Other objects and advantages of the invention will be evident from the following detailed description when read in conjunction with the accompanying drawings which illustrate the invention.

BRIEF DESCRIPTION OF THE DRAWINGS

FIG. 1 is a side view of a seismic exploration operating vessel utilizing the stiff-leg transducer support members of the present invention;

FIG. 2 is a top view of a portion of the deck of the operating vessel to show the manner in which the transducer supports are rigged outboard from the vessel;

FIG. 3 is an elevation of one form of stiff-leg support member showing the associated connective rigging as it would be attached to a seismic transducer in operating attitude; and FIG. 4 is a cross-section taken at lines 4—4 of FIG. 3.

DESCRIPTION OF THE PREFERRED EMBODIMENT

FIG. 1 shows a side view of a seismic exploration vessel 10 in its operating attitude. Such a rig as vessel 10 is known in the art as a one ship rig in that it carries both the seismic energy generation equipment as well as the returned seismic energy detection equipment and all of the control and power apparatus attendant the equipment. Thus, vessel 10 is shown with a pair of seismic transducers 12 and 14 affixed on support members 16 and 18 which are supported fore and aft, respectively, on the starboard side of the vessel 10. Actually, in its preferred form, the vessel 10 carries four seismic transducers, two additional transducers (not shown) being similarly positioned on the port side of vessel 10. The detection of returned seismic energy is effected by means of a conventional type of multi-geophone streamer 20 which is trailed at a distance off the stern of vessel 10 during a sounding sequence.

The seismic transducers 12 and 14 are supported by respective cables 22 and 24 which are connected to weighing apparatuses 26 and 28. Weighing apparatus 26 is directed outboard over the starboard side of the vessel 10 by means of a support platform 30 which supports a latch-up basket 32 out over the water. A suitable winch or other deck machinery (not specifically shown) can then be employed to draw cable 22 up through latch-up basket 32 so that the seismic transducer 12 can be locked up within the latch-up basket 32 during movement between shooting sites, rough seas, etc. Seismic transducer 14 may be similarly weighed and housed by means of cable 24 and latch-up basket 34 as supported by a support platform 36.

The forward end of the support members 16 and 18 are each pivotally supported at the ship's deck level. Support member 16 consists of a stiff-leg member 40, a hollow, wing-shaped member to be further described in detail, which is connected by a pair of lower chains 42 to the seismic transducer 12 and by a pair of upper chains 44 to a swivel 46 which is supported outboard from the vessel 10. Each of chains 42 is maintained resiliently tightened by a spring 47 to provide additional damping and transducer stability. Swivel 46 is pivotable about its horizontal, athwartships axis and it receives the flexible power and control conduits 48 from a shipboard power source 50 to supply power and control input through further flexible hose connections 52 into the stiff-leg member 40. The lower end of stiff-leg member 40 is connected to still another group of flexible hose connections 54 which provide the power and control inputs to the seismic transducer 12.

The after support member 18 is an identical configuration having a pair of lower chains 56, a pair of upper chains 58, a swivel 60 and flexible power and control conduits 62 leading to the shipboard source 64. Also, similar interconnection of power and control functions is carried out by flexible hose or conduit sections 66 and 68 connecting above and below the stiff-leg of support member 18. The seismic transducers 12 and 14 are shown as being of a hydraulic type which is presently in use such that the respective shipboard power sources 60 and 64 would provide input and return hydraulic conduits as well as air lines and electrical control cables along the respective support members 16 and 18; however, it should be understood that the transducers may be of any of the numerous types such as pneumatic, electrical, etc. and that the shipboard power sources and conduit connections will be altered accordingly.

FIG. 2 shows the manner in which the support members 16 and 18 are supported outboard from the operating vessel. For example, the swivel 46 is merely a block portion 70 having suitable fluid-flow bores with connective threads or such extending in parallel therethrough, block portion 70 having an annularly-shaped hub member 72 fastened or welded on one side in a balanced position such that it rotates freely about an axle extension 74. The axle extension 74 is then welded or otherwise secured to an A-type support frame 76 which is pivotably secured to the vessel 10. The footing of members 76 is pivotally secured as by a hinge and pin or such arrangement, e.g., a pair of eye-blocks 78 welded to the deck of vessel 10. In the particular case, the operating vessel 10 has a narrow portion of seaboard deck 80 disposed between a rub rail 82 and a rising bulwark portion 84. The swivel 70 and swivel support 76 are then pivotable upward by suitable winch machinery. For example, and referring again to FIG. 1, the forward swivel 46 could be raised by means of a cable 86 and winch 88 rigged through davit 90 and the rear swivel 60 can be raised by cable 92 rigged through davit 94 to a winch 96.

FIG. 3 shows a support member, for example, forward support member 16, and related rigging in greater detail. The stiff-leg member 40 is depicted as being connected via flexible power and control connections or conduits 54 to a seismic transducer 12 of the hydraulically actuated vibrator-type. Such a marine seismic vibrator is the particular subject matter of U.S. patent application Ser. No. 592,155, entitled, "Marine Vibration Transducer," filed on Nov. 4, 1966, in the name of Cole et al. and assigned to the present assignee. It should be understood, however, that the stiff-leg and supporting structure of the present invention is in no way limited to usage only with this type of seismic transducer apparatus.

Stiff-leg member 40 consists of a hollow, elongated member formed in two opposing, symmetrical side sections 90 and 92 (see also FIG. 4). The cross-sectional shape of the stiff-leg member 40 is a faired, tear-drop shape which offers little resistance to fluid flow. The actual transmission of power and control fluid is effected by means of a plurality of rigid metal pipes which extend the length of the stiff-leg member 40. A plurality of pipes such as larger diameter pipes 94, 98 and 100 and smaller diameter pipes 120 and 104 are maintained in secure position along one side of the interior of stiff-leg member 40 by means of a plurality of straps 106 which may be suitably spaced therealong. Actually, the number and size of pipes may vary with the particular design, but one type which is employed with a hydraulic vibrator requires the six pipes 94–104 as shown in FIG. 4. In this case, the four larger pipes 94–100 provide a one-inch hydraulic input, a ⅜ inch hydraulic input, a 1¼ inch hydraulic return, and the fourth pipe contains the various electronic cabling between the seismic transducer 12 and the operating vessel 10. The two smaller pipes 102 and 104 are air lines and they provide an air pressure sensing line and an air pressurization line.

The plurality of pipes extending through stiff-leg member 40 are preferably of the high pressure metal variety and the increase in weight over the flexible hose counterparts is actually advantageous as it lends greater mass to the stiff-leg member 40, this tending to increase towing stability. Also, a great saving in monetary outlay is effected since such high pressure metal pipe is much less expensive than flexible hose of equivalent strength.

As shown in FIG. 3, stiff-leg member 40 is shown as being thirty feet in length, however, this may be varied in accordance with the design considerations attendant the seismic operation. In the case of a thirty foot stiff-leg member 40, a pair of cutout portions 108 and 110 are positioned on opposite sides of side section 92 at the respective ten foot and twenty foot lengths. Access holes 108 and 110 serve to allow sea water flow through the stiff leg member 40, a desirable feature, and they serve primarily to provide pipe coupling access since most forms of high pressure pipe are available in ten or twenty foot lengths and it is important to allow access for periodic replacement, tightening of couplings, etc.

A plurality of louvers 112 are provided in each side section 92 and 90 preferably about five feet from the upper end. These serve to catch the water and cause flow through the length of the stiff-leg member 40 to provide three advantageous functions, (a) heat exchange, (b) vibration damping, and (c) stabilization.

Each of the high pressure pipes 94–104 has its opposite ends threaded to receive a selected high pressure hose connection. Thus, each of the flexible hoses 52 is connected to a respective high pressure pipe 94–104 by conventional hose couplings 114. The upper end of flexible hoses 52 are connected by means of hose couplings 116 into the respective threaded bores 118 through the swivel 46. Similar threaded hose connections are made between swivel 46 and hose couplings 120 to the flexible hoses 48 which lead to the power source 50 aboard vessel 10.

The lower end of the pipes 94–104 within stiff-leg member 40 are similarly attached via hose couplings 122 to the lower group of flexible hoses 54. The respective hoses 54 are then applied to the servo valve 124 and air input 126 to enable operation of the seismic transducer 12. The operation of a hydraulic-type of seismic transducer such as depicted for transducer 12 is well-known in the art and is particularly described in the aforementioned U.S. Patent application Ser No. 592,155, now Patent No. 3,394,775.

The construction of stiff-leg member 40 allows many design variations as between selection of equivalents. The leading and trailing edges of the side sections 90 and 92 are shown as being secured by means of a plurality of bolts 130, but it should be understood that various forms of fastening technique may be utilized in joining the opposite side sections. It is contemplated that a more sophisticated construction may include a smoothly hinged leading edge, thus affording even less resistance to water flow. The particular types of metal pipe employed within stiff leg member 49 as well as their respective fastening and coupling fixtures are also deemed to be a design consideration.

OPERATION

Seismic exploration employing a one-ship rig utilizing the plurality of stiff-leg members 40 in the transducer supports 16 and 18 (and two port side support fixtures not shown) results in a more efficient operating sequence. The respective seismic transducers 12 and 14 can be lowered from their latchup baskets 32 and 34 by respective cables 22 and 24 and the support members 16 and 18 will automatically guide them to their proper seismic energy generation depth. The stiff-leg member 40 offers definite advantages over the prior high pressure hose linkages, especially in hydraulic transducer systems.

The rigid connection offered by stiff-leg members 40 lessens or eliminates fluid pressure surges while maintaining the seismic transducer more accurately at its proper generating position. Attending advantages such as fluid condenser action are also realized. Louvers 112 and access holes 108 and 110 allow sea water to continually course through the stiff-leg member 40 to provide cooling heat exchange with the fluid conduits therein. Such cooling brings about a condensing action which can be very desirable in the case of hydraulic fluid flow.

After a shot run the operating apparatus can be secured by operation of ship's winch machinery to draw cables 22 and 24 upward to pull the seismic transducers 12 and 14 up within their respective latch-up baskets 32 and 34. The respective winches 88 and 96 can then be operated to draw in cables 86 and 92 such that the A-type outboard frame extensions 76 are drawn to an upright position and, when this is done, the respective support members 16 and 18 with their stiff leg members and connecting cables will fall along the deck 80 adjacent bulwark 84 for being secured thereto. This is another big advantage of the stiff-leg member 40 since previous weighing of transducer and support equipment aboard the ship required the relatively tedious hauling in and securing of plural, flopping flexible hoses. The stiff-leg member 40 offers the advantage of hauling in one element or piece for rapid securing along the deck 80.

The foregoing discloses novel rigging structure for trailing and positioning a seismic transducer in a body of water. The structure is an improvement over prior devices in that it is less expensive to construct, it maintains greater control over the positioning and latitude of the transducer, and it provides a unitary type of structure which can be more easily manipulated from and stowed aboard an operating vessel underway.

Changes may be made in the combination and arrangement of elements as heretofore set forth in this specification and shown in the drawings; it being understood, that changes may be made in the embodiments disclosed without departing from the spirit and scope of the invention as defined in the following claims.

What is claimed is:

1. Apparatus for supporting a marine seismic transducer from a vessel with a shipboard transducer power source, comprising:
    a hollow elongated substantially rigid sleeve member which is faired to have a generally wing-shaped, cross-section along its length;
    plural conduits secured within said sleeve member and extending the legth thereof;
    first flexible means comprises a plurality of flexible hoses connected between each of said plural conduits and said seismic transducer;
    retaining means connecting said transducer and tne lower end of said sleeve member to prevent strain upon said flexible hoses; and
    second flexible means for securing the other end of said sleeve member to be towed from said vessel and for connecting said plural conduits to said power source.

2. Apparatus for supporting a seismic transducer as set forth in claim 1 wherein said second flexible means comprises:
    a swivel member which is secured outboard of said vessel and is pivotable about a horizontal, athwartships axis, and which includes a plurality of bores therethrough;
    a first plurality of flexible hoses connected between each of said plural conduits and one of said bores;
    a second plurality of flexible hoses connected between the opposite ends of respective bores and said power source; and
    retaining means securing said sleeve member to said swivel member and preventing strain upon said flexible hoses.

3. Apparatus for supporting a marine seismic transducer as set forth in claim 1 which is further characterized in that said hollow elongated sleeve member includes side sections, a selected portion of a side section near the upper end and leading edge of said sleeve member is formed to have a series of louvre openings which permit water flow into and downward through said elongated sleeve member.

4. A marine seismic energy generation apparatus for operation from a vessel, comprising:
    a hollow, elongated substantially rigid sleeve member which is faired to have a generally wing-shaped, cross-section along its length;
    plural metal pipes secured within said sleeve member and extending the length thereof;
    a seismic transducer;
    a power source aboard said vessel;
    first flexible means providing retaining connection between said power source and one end of said sleeve member and the plural metal pipes;
    second flexible means comprising flexible coupling means provided between each of said metal pipes and said seismic transducer; and
    means attached between said sleeve member and said seismic transducer to provide retaining connection.

5. A marine seismic energy generation apparatus as set forth in claim 4 wherein said first flexible means comprises:
    horizontal support means extending outboard from said vessel;
    swivel means having a plurality of parallel, threaded bores therethrough, said swivel means being rotatably mounted for pivotable movement about said horizontal support member;
    first flexible coupling means provided between each of said metal pipes and first ends of said bores in said swivel means;
    second flexible couplings provided between the opposite ends of said bores and said power source; and
    chain means attached between said sleeve member and swivel means to provide retaining connection.

References Cited

UNITED STATES PATENTS

| | | | |
|---|---|---|---|
| 2,401,929 | 6/1946 | Hammond | 340—7 |
| 2,649,579 | 8/1953 | Alexander | 340—7 X |
| 3,246,286 | 4/1966 | Barry | 340—7 |
| 3,194,204 | 7/1965 | Nichols et al. | 181—0.5 |

RICHARD A. FARLEY, *Primary Examiner.*

CHARLES E. WANDS, *Assistant Examiner.*